(12) United States Patent
Banes et al.

(10) Patent No.: US 10,724,557 B2
(45) Date of Patent: Jul. 28, 2020

(54) FIREARM GRIP

(71) Applicant: Sellmark Corporation, Mansfield, TX (US)

(72) Inventors: Matthew Banes, Sachse, TX (US); Garrett Hellinger, Sachse, TX (US); Gabriel James Snyder, Sachse, TX (US)

(*) Notice: Subject to any disclaimer, the term of this patent is extended or adjusted under 35 U.S.C. 154(b) by 0 days.

(21) Appl. No.: 16/441,114

(22) Filed: Jun. 14, 2019

(65) Prior Publication Data

US 2019/0390693 A1    Dec. 26, 2019

Related U.S. Application Data

(63) Continuation of application No. 15/073,196, filed on Mar. 17, 2016, now abandoned.

(60) Provisional application No. 62/134,083, filed on Mar. 17, 2015.

(51) Int. Cl.
| | |
|---|---|
| *F16B 2/12* | (2006.01) |
| *F16M 13/02* | (2006.01) |
| *F16B 2/06* | (2006.01) |
| *F41A 23/16* | (2006.01) |

(52) U.S. Cl.
CPC ............. *F16B 2/12* (2013.01); *F16B 2/065* (2013.01); *F16M 13/02* (2013.01); *F41A 23/16* (2013.01)

(58) Field of Classification Search
CPC .... F16B 2/12; F16B 2/08; F16B 2/065; F41A 23/16; F16M 13/02

USPC ......... 248/316.6, 316.4, 228.3, 228.5, 230.3, 248/230.5, 231.51, 231.61, 231.21, 248/229.12, 229.14, 229.22, 229.24, 248/229.13, 229.23, 228.4, 230.4, 316.5

See application file for complete search history.

(56) References Cited

U.S. PATENT DOCUMENTS

| | | |
|---|---|---|
| 101,937 A | 4/1870 | Stokes et al. |
| 614,880 A | 11/1898 | Miller |
| 934,676 A | 9/1909 | Langslow |
| 971,438 A | 9/1910 | Gillitt |
| 1,395,566 A | 11/1921 | Fluhr |
| 1,407,743 A | 2/1922 | Franck |
| 1,416,148 A | 5/1922 | Williams |
| 1,631,355 A | 6/1927 | Baldwin |
| 1,709,794 A | 4/1929 | Konzelman |
| 1,726,064 A | 8/1929 | Goldstraw |
| 1,765,321 A | 6/1930 | Bodmer |
| 1,801,206 A * | 4/1931 | Mott .................... F16L 3/16 248/60 |

(Continued)

FOREIGN PATENT DOCUMENTS

GB            229971 A        3/1925

*Primary Examiner* — Kimberly T Wood
(74) *Attorney, Agent, or Firm* — Mark D. Perdue (57) ABSTRACT

A firearm grip is disclosed that attaches to a firearm, such as a rifle, by clamping on a portion of the rifle's forend, stock, buttstock or other chassis. The firearm grip disclosed herein maximizes the surface contact area to which pressure is applied to a portion of the firearm in contact with the clamp jaws of the firearm grip by the introduction of a rotating or swiveling jaw relative to the grip's fixed jaw. This enables the firearm grip to swivel and adjust to firearms of variable or tapering width along the length of the firearm in contact with the firearm grip, while maintaining optimal contact and pressure against the clamped portion of the firearm in contact with the firearm grip.

14 Claims, 7 Drawing Sheets

(56) References Cited

U.S. PATENT DOCUMENTS

| | | |
|---|---|---|
| 1,904,798 A | 4/1933 | Nurnberger |
| 2,171,789 A | 9/1939 | Gillick et al. |
| 2,195,955 A | 4/1940 | Hillenbrand |
| D143,075 S | 12/1945 | Ingwer |
| 2,642,905 A | 6/1953 | Hewat |
| 2,812,567 A | 11/1957 | Zalkind |
| 2,870,683 A | 1/1959 | Wilson |
| 2,914,829 A | 12/1959 | Willemain |
| 3,290,039 A | 12/1966 | Lancaster |
| 3,358,504 A | 12/1967 | Freebairn |
| 3,601,295 A | 8/1971 | Lowe |
| 3,768,346 A | 10/1973 | Burthardt |
| 4,141,524 A | 2/1979 | Corvese |
| 4,165,869 A | 8/1979 | Williams |
| 4,438,669 A | 3/1984 | Hastings et al. |
| 4,841,839 A | 6/1989 | Stuart |
| 5,154,210 A | 10/1992 | Scruggs |
| 5,375,337 A | 12/1994 | Butler |
| 5,667,178 A | 9/1997 | Yang |
| 5,918,843 A | 7/1999 | Stammers |
| 6,511,270 B1 | 1/2003 | Burke et al. |
| 6,986,489 B2 | 1/2006 | Oddsen et al. |
| 7,356,960 B1 | 4/2008 | Knitt |
| 8,083,198 B2 | 12/2011 | Stabler |
| 8,403,280 B2 | 3/2013 | Halverson et al. |
| 8,893,591 B2 | 11/2014 | Depue |
| 9,050,711 B1 | 6/2015 | Mazzarella |
| 9,206,941 B2 | 12/2015 | Smith et al. |
| 2005/0091779 A1 | 5/2005 | Paterson et al. |
| 2010/0102178 A1 | 4/2010 | Smith et al. |
| 2010/0261390 A1 | 10/2010 | Gardner et al. |
| 2011/0303800 A1 | 12/2011 | Sapper et al. |
| 2012/0049025 A1 | 3/2012 | Halverson et al. |
| 2013/0075564 A1 | 3/2013 | Ho |
| 2016/0108941 A1 | 4/2016 | Schaefer et al. |

* cited by examiner

FIREARM GRIP

CROSS-REFERENCE TO RELATED APPLICATIONS

This application claims the benefit of U.S. Provisional Application Ser. No. 62/134,083, filed Mar. 17, 2015, which is incorporated herein by reference in its entirety.

BACKGROUND OF THE INVENTION

The invention described herein is a firearm grip apparatus for securing a firearm, such as a rifle, to a firearm rest or support platform. Typical clamp style systems utilize opposing clamp jaws that remain in a fixed position thereby reducing the effective clamping force imparted to the firearm held in the clamp jaws. More specifically, prior art clamping type mechanisms in this field keep the clamp jaws parallel through the use of guide rods while the clamp is being tightened or loosened about a portion of the firearm to be secured. As such, the jaws of prior art firearm clamps remain fixed in a parallel configuration which typically results in a reduced surface pressure contact producing an incomplete, ineffective clamping force which allows the rifle to move in various directions while retained in the jaws of such prior art clamp systems. In part, this inability to securely clamp a firearm is due to the various shape configurations of modern rifle systems that include tapering rail system forends, modular stocks and other tactical equipment add-ons that may result in a rifle or firearm with a varied surface topography along the buttstock, rifle stock, receiver or forend/handguard locations on the firearm. As a result, prior art clamp style firearm grips are not able to provide a secure grip to a variety of firearm shapes and styles which impact the surface area available for contact with a clamp style firearm grip.

As such, there is a need in the art for an improved firearm grip which provides a movable and rotatable jaw clamp which enables the jaw clamp to swivel and securely provide multiple contact points along a portion of a firearm to provide increased fixation and stability to a firearm fixed in the firearm grip.

SUMMARY OF THE INVENTION

A firearm grip is disclosed that that attaches to the firearm by clamping down on a portion of the firearm's forend, stock, buttstock or other chassis. The firearm grip disclosed herein maximizes the surface contact area to which pressure is applied to a portion of the firearm in contact with the clamp jaws by the introduction of a rotating or swiveling movable jaw relative to the grip's fixed jaw.

In an embodiment, the firearm grip comprises a fixed jaw and an opposing movable jaw, which may include one or more jaw fingers on each opposing jaw, where the opposing movable jaw is drawn closer to or pushed further away from the fixed jaw via a rotatable clamp screw in mechanical communication with a traveler slidably engaged with a slot in the fixed jaw and the traveler attached to the movable jaw. The fixed jaw includes various preformed holes providing for the attachment of the firearm to a tripod mounting system or other conventional mounting systems. In an embodiment, the user rotates the clamp screw with a knob attached to an end of the clamp screw which acts to push the clamp jaws apart to a sufficient span to allow the user to place a portion of a firearm between the opposing clamp jaws. The user then counter-rotates the clamp screw via the knob and draws the movable jaw toward the fixed jaw until one or more of the fixed and movable jaw fingers contact the surface of the firearm disposed between the opposing jaws. The user continues to counter-rotate the clamp screw with the knob until sufficient pressure to retain the firearm gripped between the opposing jaws exists. The user may then thereafter remove the firearm from the firearm grip by rotating the clamp screw knob until the fixed jaw and movable jaw are sufficiently distant from one another to allow the user to remove the firearm from the opposing jaw clamps.

In an embodiment, the firearm may be of varying width dimension along the length of the firearm to be secured with the firearm grip disclosed herein. The user rotates the clamp screw with a knob which pushes the clamp jaws apart to a distance sufficient to allow the user to place a portion of the firearm between the opposing clamp jaws. The user then counter-rotates the knob and draws the movable jaw toward the fixed jaw until one or more of the fixed and movable jaws and corresponding jaw fingers contact the surface of the firearm disposed between the opposing jaws. When the opposing fixed and movable jaws come into contact with the firearm to be secured, the user continues to rotate the clamp screw knob which will continue drawing the movable jaw towards the fixed jaw and allow the movable jaw to swivel or rotate in horizontal plane allowing the fixed and movable jaws to substantially conform to the increasing or decreasing dimensions of the firearm to be secured within the firearm grip. The user then continues to counter-rotate the clamp screw knob until sufficient pressure to retain the firearm gripped between the opposing jaws exists. The user may then thereafter remove the firearm from the firearm grip by rotating the clamp screw knob until the fixed jaw and movable jaw are sufficiently distant from one another to allow the user to remove the firearm from the opposing jaw clamps.

BRIEF DESCRIPTION OF THE DRAWINGS

The present invention is more easily understood by reading the following detailed description, with reference made to the accompanying drawings, wherein.

DETAILED DESCRIPTION

Figure 1:
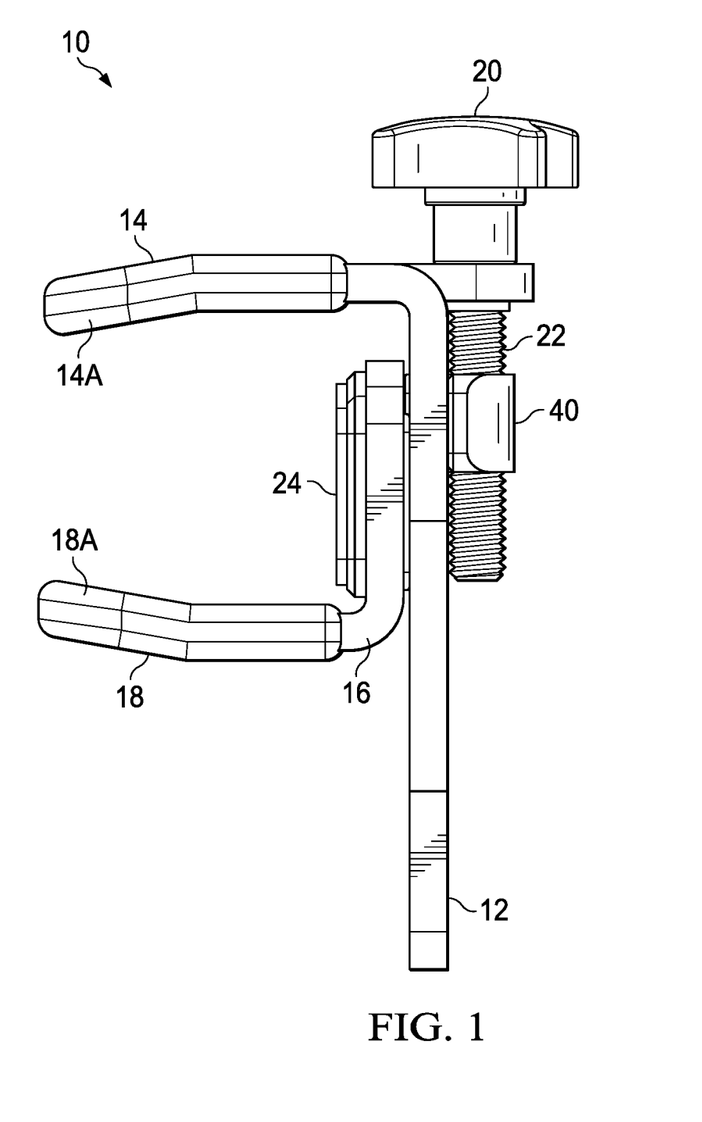
FIG. 1 is a front view depicting an embodiment of the firearm grip disclosed herein.

Referring to FIG. 1, an embodiment of a firearm grip 10 is shown. Grip 10 comprises a fixed jaw 12 and a movable jaw 16 slidably connected to each other. Fixed jaw 12 includes one or more jaw fingers 14 and movable jaw includes one or more jaw fingers 18. Jaw fingers 14, 18 may be formed in straight or curved orientations to provide a plurality of gripping contact surfaces to accommodate a variety of firearm shapes and sizes as described herein. As is illustrated, both fixed and movable jaws 12, 16 may be generally L-shaped and each may be formed from a single piece of material. Each jaw 12, 16 includes a planar base portion with jaw fingers 14, 18 extending or projecting upwardly and generally perpendicularly to the respective planar base portions at one end thereof.

Figure 2:
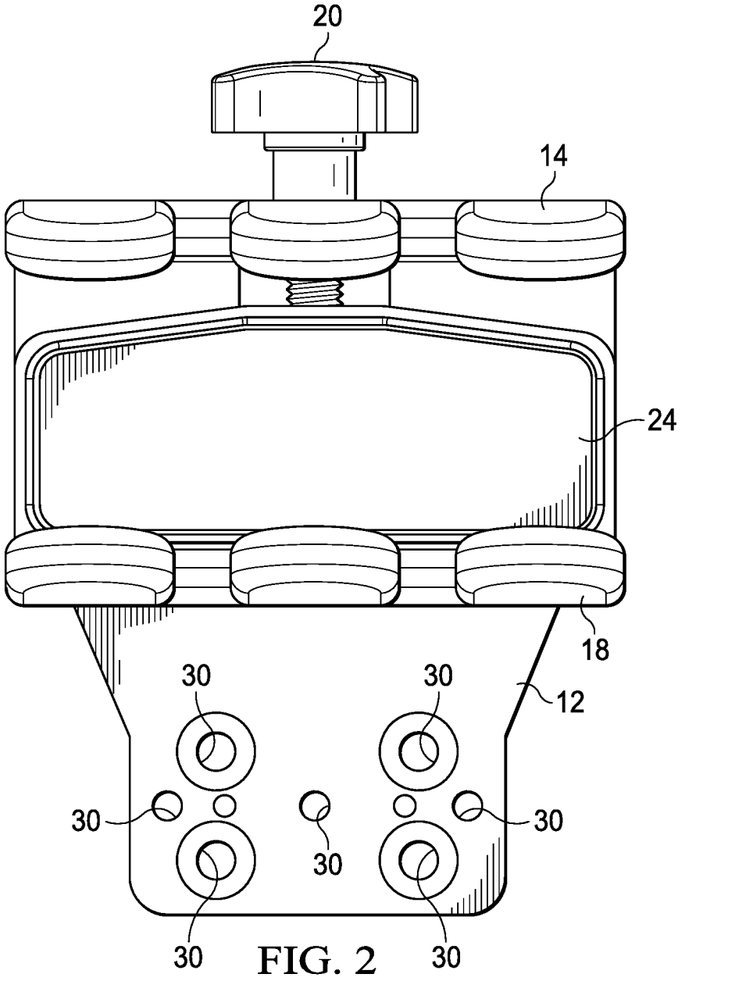
FIG. 2 is a top view depicting an embodiment of the firearm grip disclosed herein.
Figure 6:
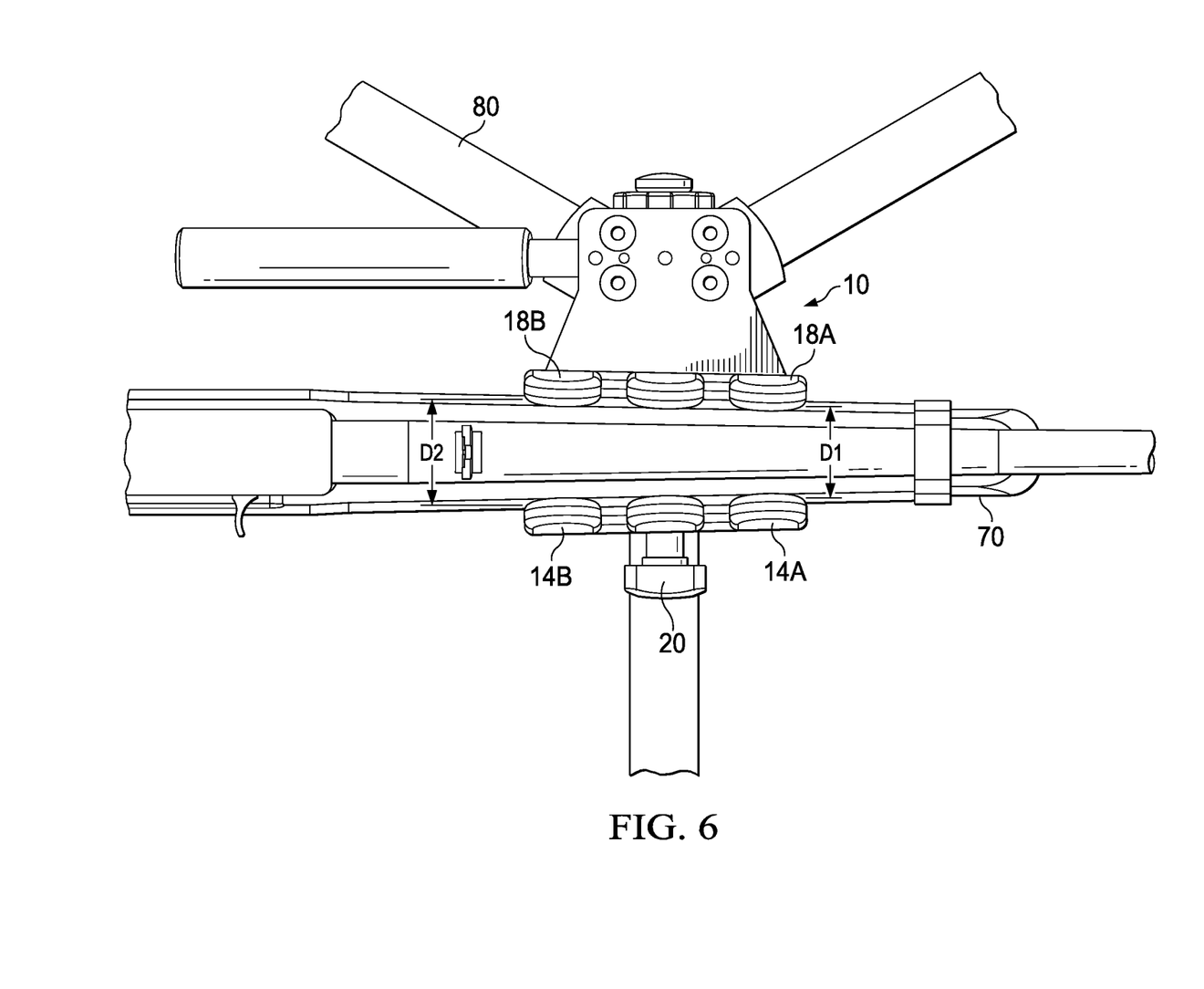
FIG. 6 is a top view of a firearm with a varying handguard width secured by an embodiment of the firearm grip disclosed herein; and, FIG. 7 is an exploded view depicting an embodiment of a traveler component of the firearm grip disclosed herein.

With reference to the depicted embodiment in FIG. 2, pads 14A, 18A provide environmental protection to the jaw fingers 14, 18 and also act to substantially prevent or reduce damage to the surfaces of a firearm held in contact with jaw fingers 14, 18 during use of grip 10 as disclosed herein. In similar fashion, pad 24 provides protection to the firearm surfaces in contact with a portion of movable jaw 16 while a firearm is secured within the grip 10 as shown in FIG. 6 described herein below. Furthermore, the distal portion of jaw fingers 14,18 may be curved or slightly bent or turned inward to help hold the firearm 70 (see FIG. 6) in place when grip 10 is firmly secured or clamped to the firearm stock or other location suitable for gripping on the firearm. As grip 10 is tightened by rotation of knob 20, the angular surfaces on jaw fingers 14,18 create slight downward pressure on the rifle further locking it into a secure, immobilized position.

Figure 3:
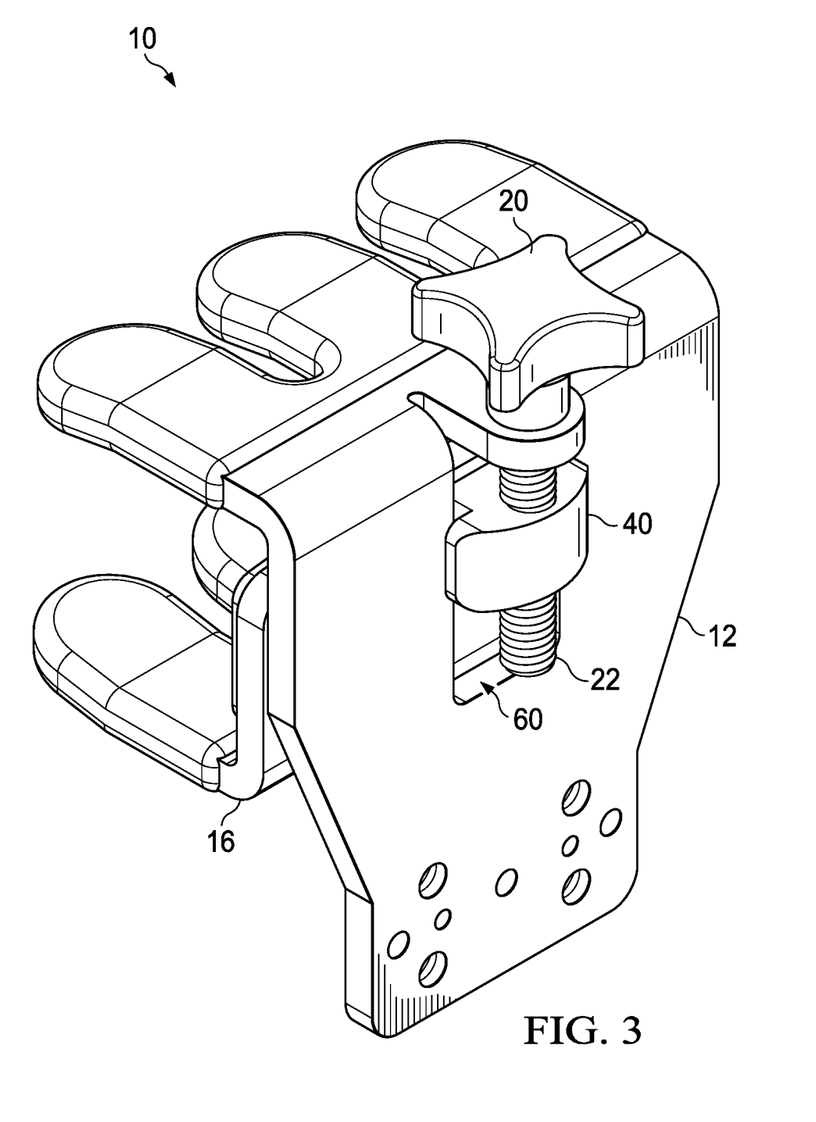
FIG. 3 is a bottom perspective view depicting an embodiment of the firearm grip disclosed herein.
Figure 4:
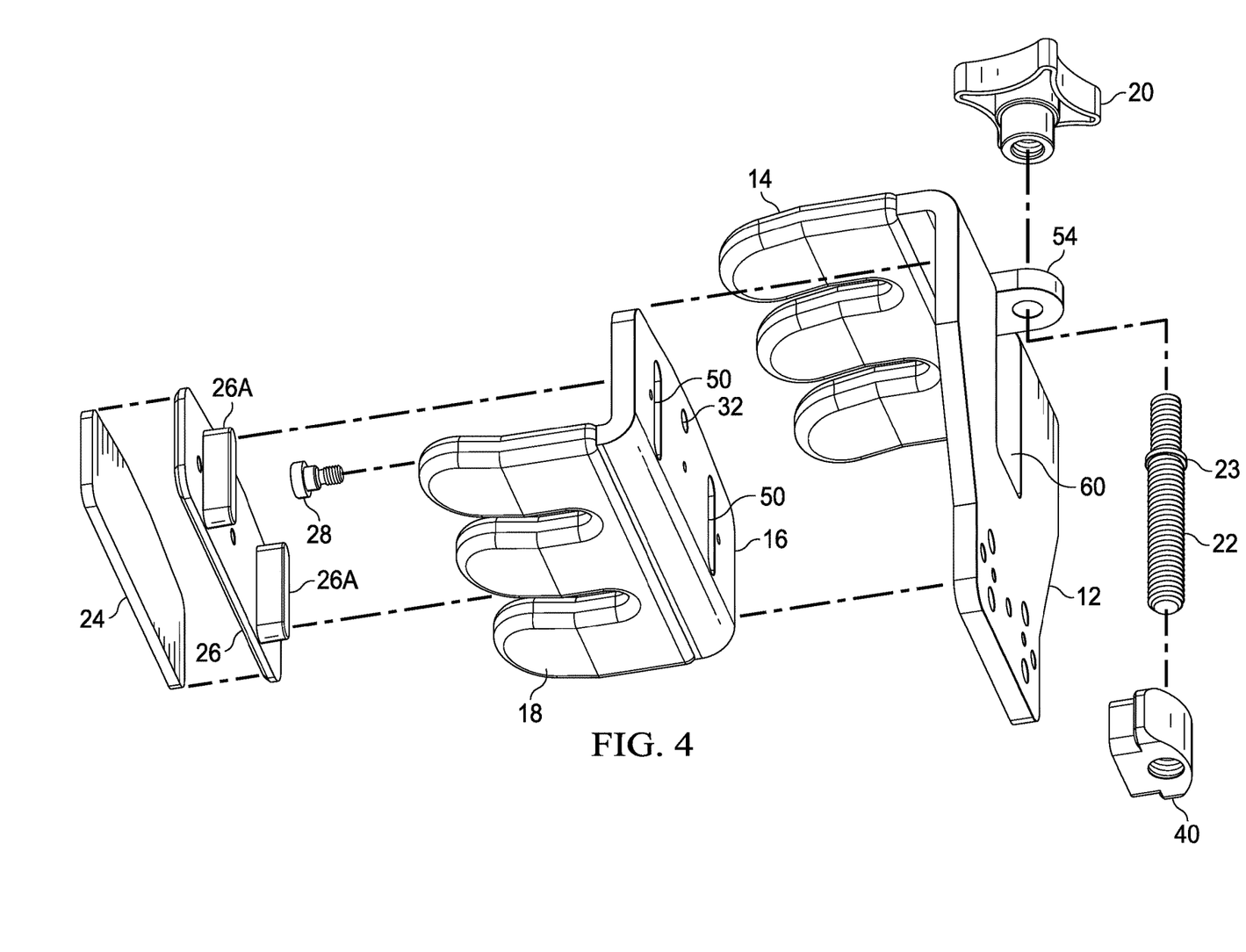
FIG. 4 is an exploded view depicting an embodiment of the firearm grip disclosed herein.

Now turning to FIGS. 3 and 4, a traveler 40 is shown in slidable mechanical communication with fixed jaw 12 and also fixedly attached to movable jaw 16. The traveler 40 is retained in relative position to fixed jaw 12 with knob 20 attached to an end of threaded clamp screw 22 extending through stop 54 (see FIG. 4) formed as part of fixed jaw 12 and a screw shoulder 23 which act to retain clamp screw 22 with fixed jaw 12. Traveler 40 is threadedly attached to the remaining portion of clamp screw 22 as shown. As clamp screw 22 is rotated or counter-rotated by the user rotating or counter-rotating knob 20, the traveler moves directionally toward or away from the knob 22 along the length of clamp screw 22. In turn, the rotation of knob 22 results in the traveler drawing the movable jaw 16 towards the fixed jaw 12 or conversely the counter-rotation of the knob 20 moves movable jaw 16 away from fixed jaw 12. Mounting holes 30 are preformed and provided in a portion of fixed jaw 12 that provide the user with the ability to mount firearm grip 10 to a tripod or other tripod mounting accessory as desired. Grip 10 was designed to be mounted via mounting holes 30 in an offset slightly from center in order to allow all types of rotational movement when using firearms with high capacity magazines, sighting or lighting accessories, or when using firearms with a unique contour that would otherwise limit movement if the rifle was positioned directly over a tripod or other mount as seen in other common shooting platforms.

Figure 7:
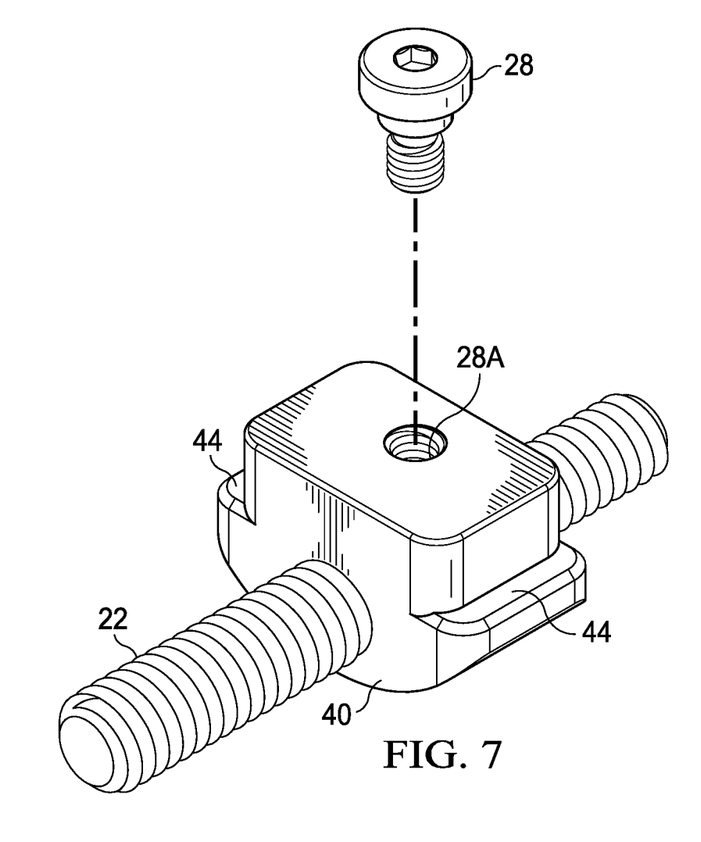

FIG. 4 is an exploded view of an embodiment of firearm grip 10. During assembly of firearm grip 10, movable jaw 16 is slidably secured to fixed jaw 12 by inserting swivel screw 28 through pivot screw hole 32 in movable jaw 16 and through center slot 60 of fixed jaw 12 and threading swivel screw 28 into traveler 40 at threaded screw orifice 28A (see FIG. 7 for an exploded view of traveler 40). Traveler 40 is in slidable communication with fixed jaw 12 via slot 60 and retained in slot 60 by a portion of the traveler residing within slot 60 and flanges 44 in slidable communication with a surface of fixed jaw 12, flanges 44 being located on opposing sides of traveler 40 as shown in FIG. 7. When knob 20 is rotated by the user, traveler 40 moves and is slidably guided and retained along center slot 60 due to flanges 44 which extend from opposing sides of traveler 40 (see FIGS. 3 and 7). Pivot screw 28 allows movable jaw 16 to rotate about pivot screw 28 providing firearm grip 10 with the ability to rotate and form multiple contact surfaces between jaws 12, 16 and jaw fingers 14, 18 that are brought into contact with a variety of firearms with varying firearm widths as will be described in detail below. Pad base 26 includes pad tabs 26A which are inserted into corresponding tab slots 50, 52 formed in movable jaw 16 providing a secure attachment of the pad base 26 to the movable jaw 16. Pad 24 is attached to pad base 26 and provides a cushion non marking surface upon which a firearm secured in the firearm grip 10 may rest. Pad 24 provides stability to a firearm secured in firearm grip 10 while substantially preventing scuffing or marring of firearm body while the firearm grip 10 is in use. Pads 14A, 18A, and 24 may be made of plastic, rubber or other elastic materials which provide protection to the jaws and jaw fingers and may include non marking and non marring characteristics so as to protect the surface and finish of a firearm secured by grip 10.

FIG. 6 provides an overhead view of the variable firearm topography retention capability of grip 10, showing the smaller width distance of the firearm 70 handguard (depicted as D1) and the larger width distance of firearm 70 handguard (depicted as D2). Due to the tapering width of the handguard of firearm 70 where D1 is smaller than D2 (D1<D2), as the user rotates knob 20 to draw opposing jaws 12, 16 together to secure firearm 70 in firearm grip 10, movable jaw 16 rotates as necessary to compensate for the variance in firearm width as between D1 and D2, thereby providing increased contact points between firearm 70 and fixed and movable jaw clamps 12, 16 and corresponding jaw fingers 14, 18. Likewise, in an embodiment where D1 is greater than D2 (D1>D2) movable jaw 16 would counter-rotate accordingly to accommodate the width of firearm 70 and provide a secure clamp grip along a portion of the firearm stock in contact with grip 10.

Figure 5:
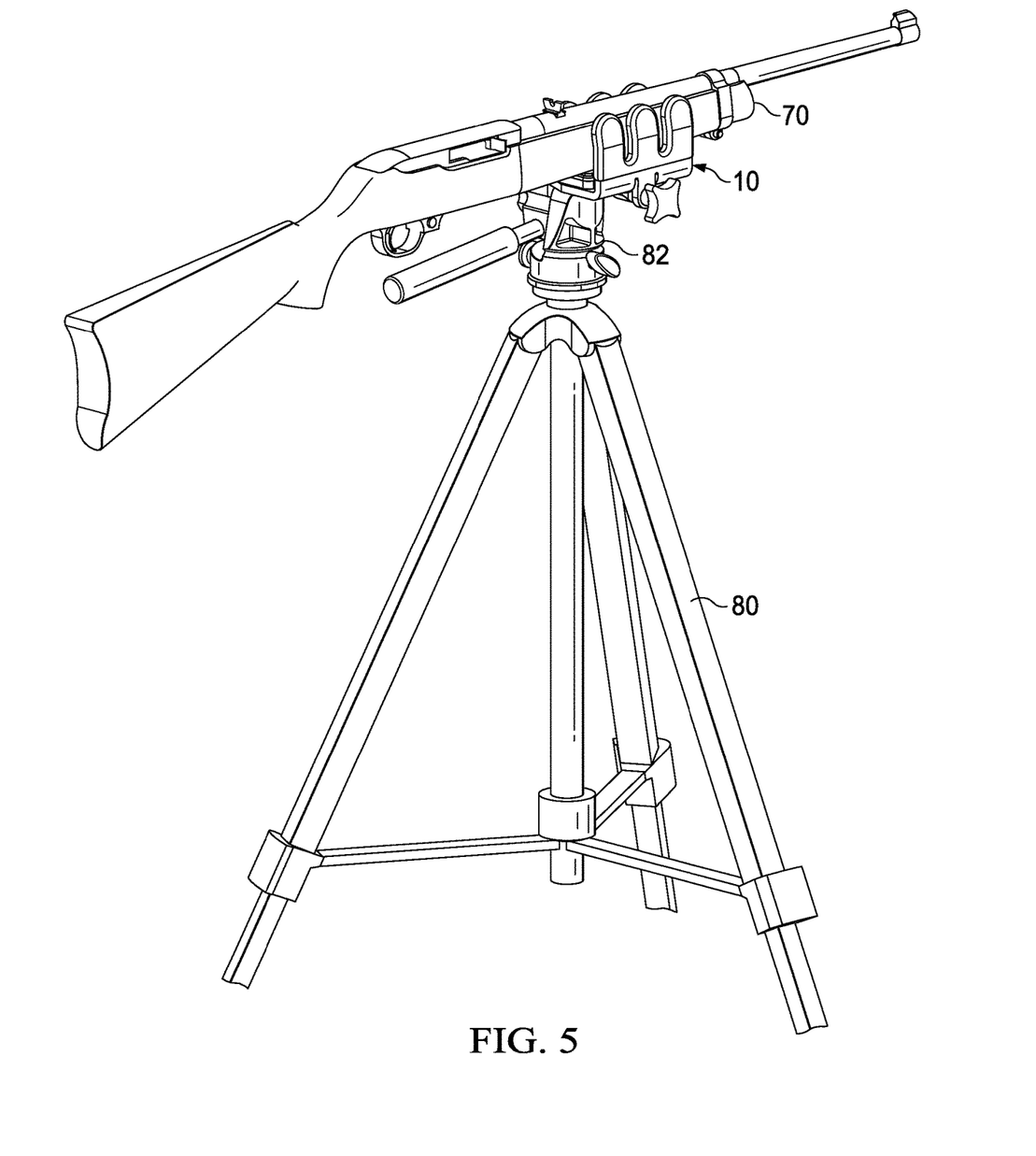
FIG. 5 is a depiction of a firearm secured with an embodiment of the firearm grip disclosed herein attached to a tripod stand.

Turning to back FIG. 5, a firearm 70 is shown secured with firearm grip 10 in a contemplated use of an embodiment disclosed herein. In this depiction, firearm grip 10 is attached to hinge block 82 that is attached to tripod 80. Firearm grip 10 provides a secure connection between firearm 70, hinge block 82 and tripod 80 so that a user may pan, tilt or otherwise rotate hinge block 82 in three-dimensional space to position firearm 70 as desired and keep it oriented at the target. Firearm grip 10, hinge block 82 and tripod 80 maybe easily assembled and disassembled for transport and use in a variety of locations and environments. When properly affixed to firearm 70, firearm grip 10 also may act as a recoil reducer as some of the firearm's recoil is absorbed in by the grip 10 and transmitted to hinge block 82 and tripod 80. In an embodiment, firearm grip 10 is designed to work with hinge block 82, but may also be affixed to other tripod devices that allow for pan and tilt about the tripod. Firearm grip 10 is not limited to use with firearms, such as rifles and pistols, and can easily be used to secure spotting scopes, cameras, range finders or any other optical or firearm related devices that might be used in this field. Likewise, the jaw, jaw finger, traveler, knob and clamp screw components of the firearm grip 10 may be manufactured from metals of sufficient strength, such as aluminum or stainless steel, structural plastics and polymers, or other materials as generally known suitable for such use.

Illustrative embodiments have been described herein and it will be apparent to those skilled in the art that the above apparatus and methods may incorporate changes and modifications without departing from the general scope of the disclosed invention. It is intended to include all such changes and modifications within the scope of the present invention.

What is claimed is:

1. An apparatus for stabilizing and supporting an object on a stand, the apparatus comprising:
    a fixed jaw including a planar base portion and at least one jaw finger projecting upward from the planar base portion;
    a movable jaw including a planar base portion and at least one jaw finger projecting upward from the planar base portion;
    a slot formed in the planar base portion of the fixed jaw;
    a traveler sliding in the slot and removably secured to the planar base portion of the movable jaw and the fixed jaw, wherein the planar base portions of the fixed and movable jaws are coupled together in mating, sliding relation wherein the coupling between the movable jaw, sliding jaw, and the traveler permits the movable jaw to rotate relative to the traveler and to the fixed jaw, the traveler including a threaded aperture;
    a threaded rod carried for rotation by the fixed jaw and received in the threaded aperture of the traveler, wherein rotation of the threaded rod in the threaded aperture of the traveler causes relative movement between the jaw fingers of the fixed and movable jaws; and
    a generally vertically extending stand having an upper extent secured to the mounting fixture in the planar base portion of the fixed jaw on a side of the planar base portion opposite that having the jaw finger, wherein the fixed and movable jaws are oriented for movement generally transversely to the stand.

2. The apparatus according to claim 1, further comprising:
    a resilient pad on an upper surface of the planar base portion of the movable jaw to protect the object.

3. The apparatus according to claim 2, further comprising:
    resilient material covering at least a portion of the jaw fingers to protect the object.

4. The apparatus according to claim 2, further comprising:
    a knob on an end of the threaded rod to facilitate rotation of the threaded rod.

5. The apparatus according to claim 1, further comprising:
    a tab extending from the planar base portion of the fixed jaw on an opposite side from the jaw finger, the tab including an aperture in which the threaded rod rotates.

6. The apparatus according to claim 1 further comprising:
    a pair of flanges on either side of the traveler to retain the traveler in the slot.

7. The apparatus according to claim 1, wherein the at least one jaw finger on each of the fixed and movable jaws further comprises a plurality of jaw fingers, each jaw finger at least partially covered with a pad material.

8. An apparatus for stabilizing and supporting a firearm on a tripod, the apparatus comprising:
    a fixed jaw including a planar base portion having a free end and at least one jaw finger extending generally perpendicularly from the planar base portion at an opposite end, a distal end of the jaw finger being angled toward the free end of planar base portion;
    a movable jaw including a planar base portion having a free end and at least one jaw finger extending generally perpendicularly from the planar base portion at an opposing end, a distal end of the jaw finger being turned toward the free end of the planar base portion;
    a central slot formed in the planar base portion of the fixed jaw;
    a traveler sliding in the central slot and removably secured to the planar base portion of the movable jaw and the fixed jaw, wherein the planar base portions of the fixed and movable jaws are coupled together in overlying, parallel, sliding relation, wherein the coupling between the movable jaw, sliding jaw, and the traveler permits the movable jaw to rotate relative to the traveler and to the fixed jaw, the traveler including a threaded aperture and a flange on opposing sides of the traveler to at least partially retain it in the central slot;
    a threaded rod carried for rotation by the fixed jaw and received in the threaded aperture of the traveler, wherein rotation of the threaded rod in the threaded aperture of the traveler causes relative movement between the jaw fingers of the fixed and movable jaws; and
    a generally vertically extending tripod having an upper extent secured to the mounting fixture in the planar base portion of the fixed jaw on a side of the planar base portion opposite that having the jaw finger, wherein the fixed and movable jaws are oriented for movement generally transversely to the tripod.

9. The apparatus according to claim 8, further comprising:
    a knob on an end of the threaded rod to facilitate rotation of the threaded rod.

10. The apparatus according to claim 8, further comprising:
    a pair of flanges on either side of the traveler to retain the traveler in the slot.

11. The apparatus according to claim 8, further comprising:
    a pad on an upper surface of the planar base portion of the movable jaw to protect the object.

12. The apparatus according to claim 7, further comprising:
    resilient material covering at least a portion of the jaw fingers to protect the object.

13. The apparatus according to claim 8, wherein the at least one jaw finger on each of the fixed and movable jaws further comprises a plurality of jaw fingers, each jaw finger at least partially covered with a pad material.

14. An apparatus for stabilizing and supporting firearm on a tripod, the apparatus comprising:
    a fixed jaw having a base formed of a planar material having a selected width, and upper and lower surfaces;
    at least one fixed jaw finger formed of the planar material and extending generally perpendicularly from the upper surface of the base of the fixed jaw and having a fixed jaw height less than the selected width of the fixed jaw;
    a movable jaw having a base formed of a planar material having a selected width less than or equal to the selected width of the fixed jaw, and having upper and lower surfaces;
    at least one movable jaw finger formed of the planar material and extending generally perpendicularly from the upper surface of the base of the movable jaw, and having a movable jaw height less than the selected width of the fixed jaw;
    a central slot formed in the planar material of the fixed jaw;
    a traveler sliding in the central slot and rotatably secured to the base of the movable jaw, wherein the upper surface of the fixed jaw and lower surface of the movable jaw are coupled together in overlying, parallel, sliding relation, and wherein the fixed jaw fingers generally face and oppose the movable jaw fingers and the movable jaw is rotatable about the traveler and relative to the fixed jaw;

a pair of flanges, each flange on an opposite side of the traveler to at least partially retain it in the central slot;
a threaded aperture extending through the traveler;
a tab extending generally perpendicularly from the lower surface of the base of the fixed jaw proximal the fixed jaw finger, the tab including a tab aperture;
a threaded rod carried for rotation in the tab aperture and received in the threaded aperture of the traveler, wherein rotation of the threaded rod in the threaded aperture of the traveler causes relative movement between the jaw fingers of the fixed and movable jaws;
a knob mounted on an end of the threaded rod to facilitate rotation of the rod and relative movement of the fixed and movable jaws;
a resilient material at least partially covering the upper surface of the base of the movable jaw and on opposing faces of the movable and fixed jaw fingers; and
a generally vertically extending tripod secured to the lower surface of the fixed jaw, wherein the fixed and movable jaws are oriented generally transversely to the tripod.

\* \* \* \* \*